Aug. 25, 1959  C. A. WUERKER, JR  2,900,660
LAWN MOWER HANDLE
Filed Dec. 3, 1956
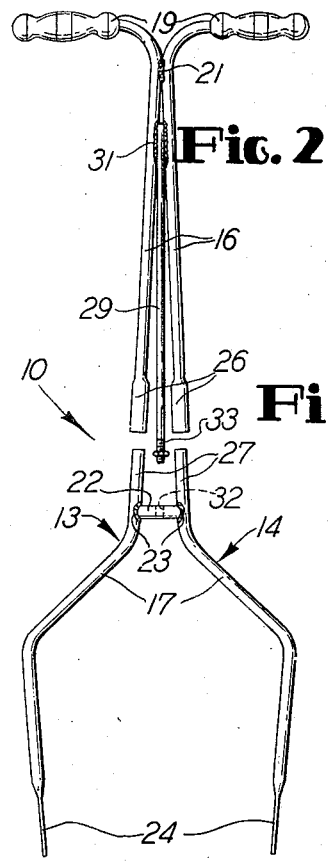
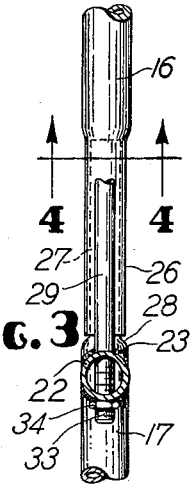
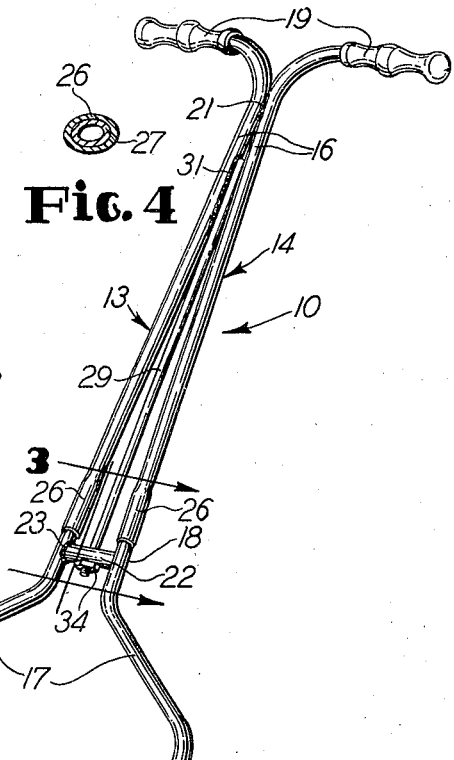
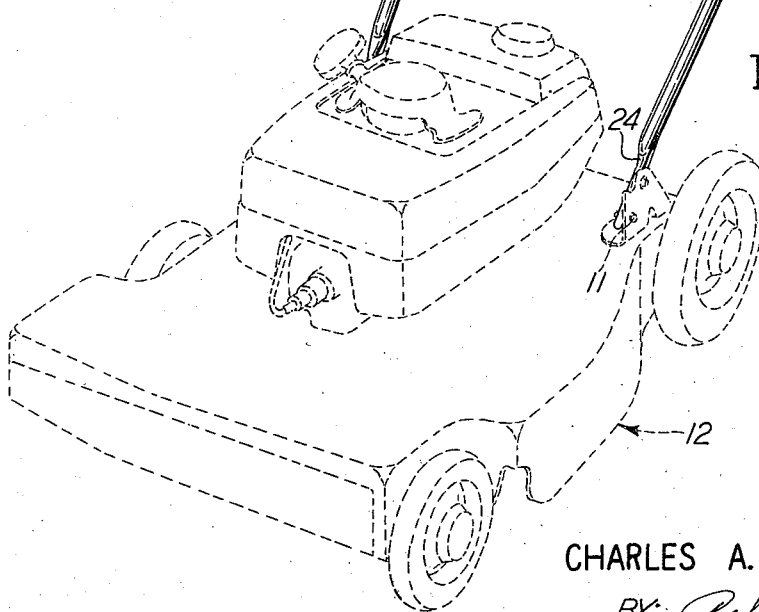
INVENTOR:
CHARLES A. WUERKER, JR.
BY: Arthur J. Hansmann
ATTORNEY

United States Patent Office 2,900,660
Patented Aug. 25, 1959

2,900,660

LAWN MOWER HANDLE

Charles A. Wuerker, Jr., Racine, Wis., assignor to Jacobsen Manufacturing Company, Racine, Wis., a corporation of Wisconsin Application December 3, 1956, Serial No. 625,878

3 Claims. (Cl. 16—111)

This invention relates to lawn mower handles of the type which is separable for reduction to a shorter length for the purpose of packing and shipping and storage.

It is an object of this invention to provide a separable type of lawn mower handle wherein the means for securing the handle together is simplified.

A specific object of this invention is to provide a lawn mower handle of the type wherein the handle ends are separably telescoped together, with said invention characterized by the improvement upon the usual means of providing bolts passing through the telescoped handle ends.

Still another object of this invention is to provide a lawn mower handle of the separably telescoping type with said invention characterized by securing the telescoping ends together through a force directed axially of said ends.

Other objects and advantages will become apparent upon reading the following description in conjunction with the accompanying drawings, wherein:

Fig. 1 is a front perspective view of a preferred embodiment of a handle of this invention and showing said handle attached to a lawn mower shown in dotted lines.

Fig. 2 is a reduced front orthographic view of the handle shown in Fig. 1 but showing the handle separated.

Fig. 3 is an enlarged sectional view taken on the line 3—3 of Fig. 1.

Fig. 4 is a sectional view taken on the line 4—4 of Fig. 3.

Similar reference numerals refer to similar parts throughout the views.

A handle 10 is shown pivotally attached at 11 to a lawn mower 12 shown in dotted lines. The handle is comprised of two tubular members 13 and 14 which each include an upper part or section 16 and a lower part or section 17. The sections 16 and 17 have an externally apparent juncture at the line 18 on Fig. 1. Of course, hand grips 19 are included in the upper part 16 to be disposed transverse to the longitudinal axis of the handle 10. Also, the upper sections 16 are shown welded together at 21 and the lower ends of the upper sections are divergent from the weld. Also, the sections 17 are joined together at their upper ends by a cross bar 22, which is shown welded at 23 to the insides of the sections 17, and the lower ends of the sections 17 are spaced apart further than said upper ends, but said lower ends are convergent as shown in Fig. 2. Of course, the terminal ends 24 of said lower ends are preferably flattened as shown for connecting with the lawn mower 12.

With regard to the telescoping ends 26 and 27 on the half portions or upper and lower sections 16 and 17, respectively, it will be seen that the ends 26 and 27 are flattened and normally telescoped together as in Figs. 1, 3, and 4. Of course, Fig. 2 shows the sections 16 and 17 separated. The purpose for the flattening of the telescoped ends 26 and 27 is to avoid any rotation of one end with respect to the other since no bolts are transversely disposed through the ends. A stop shoulder 28 is thus formed on the end 27 which is inside the end 26, and the latter can thus telescope with the end 27 to a maximum position of abutment with the shoulder 28, as shown.

An important feature of this structure is the provision of a connector or tie rod 29 which is welded at 31 to the sections 16 and extends along the longitudinal axis of the handle 10. The rod 29 projects through a central opening 32 in the cross bar 22, and the end 33 of the rod is threaded. As thus shown, the rod 29 is of a length greater than one-half the length of the handle upper half 16, so that the intermediate length of the upper half will be under a compressive force by virtue of that described and shown herein. Also, the welded connection at 31 provides additional handle strength from the grips 19, through the connection 21, and to the connection 31. The grips are, of course, the points at which the bending and torsion forces are applied to the handle. A nut 34 is threaded on the rod end 33, and the nut abuts the underside of the bar 22. Tightening of the nut will draw the telescoping sections 16 and 17 together to where the edge of the end 26 abuts the shoulder 28 on the end 27. In this manner, the opposite halves 16 and 17 of the handle 10 are securely telescoped together without the need for bolts extending through transverse holes in the ends. Thus, the need for alignment of transverse holes is eliminated, and tightening of the nut 34 will automatically draw the telescoping parts to their desired final positions.

While a specific embodiment of this invention has been shown and described, it should be obvious that certain changes could be made therein, and the invention should, therefore, be limited only by the scope of the appended claims.

What is claimed is:

1. A lawn mower handle comprising a pair of juxtaposed members including an upper half and a lower half and being attachable to a lawn mower at one end of said lower half and with hand grips at one end of said upper half and said halves being fixed together and being separable from each other at the other ends thereof opposite each said one end, said members at said one end of said upper half being disposed to converge together and being fastened together at the point of convergence, a tie rod of a length greater than one-half the length of said halves and having one end snugly disposed between the converging portions of said members and welded to said one end of said upper half thereof where said hand grips are disposed, a cross bar attached to said other end of said lower half of said members and having an opening therethrough in the plane of said members, the other end of said tie rod being a threaded end and extended through said opening, and a nut attached to said threaded end for securing said halves together.

2. A lawn mower handle comprising a pair of tubular members attached together at their opposite halves to form two sections and having said sections separably telescoped together in flattened end portions with one of said sections including hand grips at one terminal end thereof opposite said end portions and with the other of said sections being attachable to a lawn mower, a cross bar attached to and extending between said end portions of said other of said sections and said cross bar having an opening therethrough disposed in the plane of said tubular members, a tie rod of a length greater than one-half the length of said one of said sections and being attached to said one of said sections at the end thereof adjacent said hand grips and disposed intermediate said tubular members and extended through said opening in said cross in a threaded end, and a nut threaded on said threaded end for releasably securing together said tie rod and said cross bar.

3. A lawn mower handle comprising a pair of tubular members attached together at the opposite half portions to form upper and lower sections and having said sections separably telescoped together in end portions with said upper one of said sections including hand grips at one end thereof and said lower one of said sections being attachable to a lawn mower, said lower one of said sections being telescoped inside said upper one of said sections and said lower one of said sections having a stop shoulder for limiting maximum telescopic relation, a cross bar attached to and extending between said members of said lower one of said sections, and said cross bar having an opening therethrough disposed in the plane of said tubular members, a tie rod of a length greater than one-half the length of said upper one of said sections and being attached to said upper one of said sections at the end thereof adjacent said hand grips and extending through said opening in said cross bar in a threaded end extending therewithin and beyond said cross bar, and a nut threaded on said threaded end and engaged with said cross bar for drawing said sections together to said maximum telescopic relation in engagement of said stop shoulder.

References Cited in the file of this patent

UNITED STATES PATENTS

| | | |
|---|---|---|
| D. 171,079 | Butler | Dec. 15, 1953 |
| 1,830,862 | Townsend | Nov. 10, 1931 |
| 2,522,579 | Rette | Sept. 19, 1950 |
| 2,602,953 | Dalglish | July 15, 1952 |
| 2,624,168 | Clemson | Jan. 6, 1953 |
| 2,651,804 | Wilkin | Sept. 15, 1953 |

FOREIGN PATENTS

| | | |
|---|---|---|
| 122,235 | Australia | Sept. 19, 1946 |